April 17, 1934.   C. W. HUNT   1,955,069
PIPE COUPLING AND PIPE JOINT
Filed Oct. 27, 1930
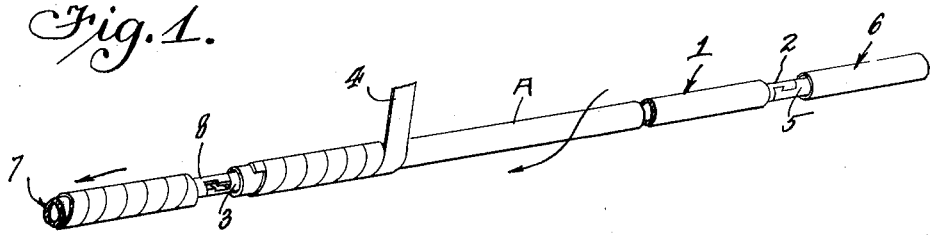
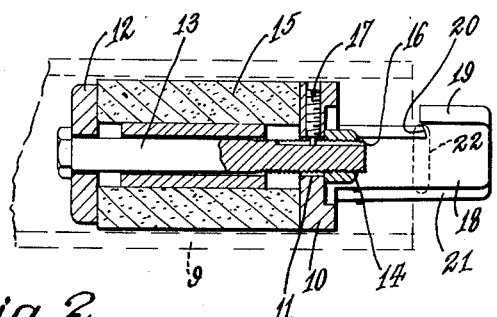
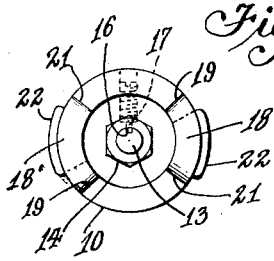
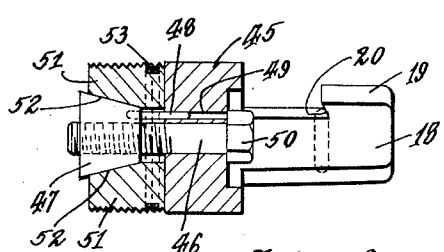
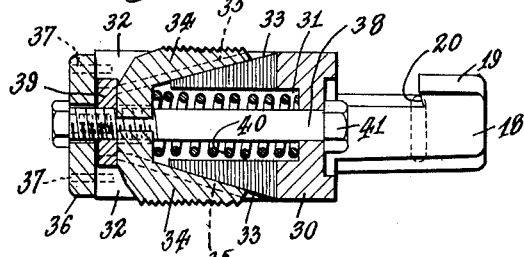
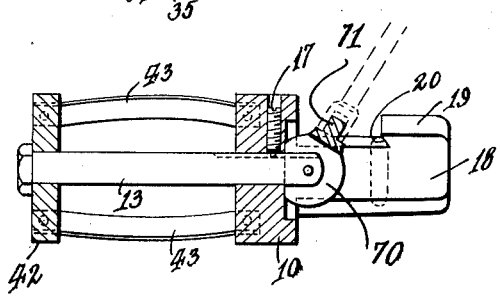
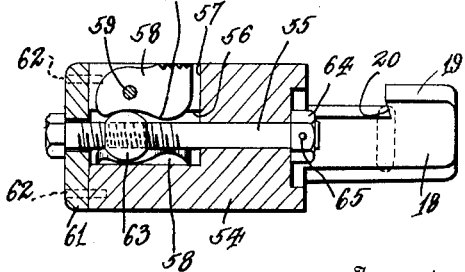
Inventor
Carll W. Hunt
By Lyon & Lyon
Attorneys Patented Apr. 17, 1934

1,955,069

UNITED STATES PATENT OFFICE 1,955,069

PIPE COUPLING AND PIPE JOINT

Carll W. Hunt, Los Angeles, Calif., assignor, by mesne assignments, to The Johnson-March Corporation, Long Island City, N. Y., a corporation of Delaware Application October 27, 1930, Serial No. 491,428

11 Claims. (Cl. 285—1)

This invention relates to a pipe coupling by means of which lengths of pipe may be readily connected so as to permit one section of pipe to impart torque to another section of pipe in alignment therewith and at the same time permit one of said pipe sections to transmit tractive force to the other section of pipe. In addition the pipe coupling of this invention is adapted to cause connection to be made between sections of pipe by a partial rotation of interengaging couplings in one direction, such connection being broken automatically by a partial rotation of the couplings relatively to each other in an opposed direction.

Although the pipe couplings of this invention are adapted for use in a number of different ways and for various purposes, the invention will be particularly described as it pertains to pipe couplings for use in the pipe coating, wrapping and protecting art.

For this purpose a great need has been experienced for pipe couplings or similar means for selectively connecting and then releasing aligned sections of pipe and heretofore rather complex structures involving threaded engagement with the internally threaded ends of pipe have been used. These prior coupling devices have not been satisfactory as they are not easily installed, are not easily removed, do not maintain engagement during the pipe wrapping or coating operation in which the pipe is helically advanced and furthermore necessitate the use of male and female coupling portions which have to be carefully matched in order to produce a joint at all.

The coupling of this invention, however, is interchangeable, that is, it assumes but a single form and therefore male and female portions are not used. Furthermore, the pipe coupling of this invention is of the internal expanding type and automatically releases the joint as soon as the joint passes through the driving means used in helically advancing the pipe coupled by means of couplings embodying this invention.

An object of this invention is to disclose and provide a pipe coupling by means of which adjacent sections of pipe may be readily connected with each other by partial rotation of the couplings relatively to each other.

Another object is to disclose and provide a coupling by means of which adjacent longitudinally aligned sections of pipe may be quickly and readily joined together or released.

Another object is to disclose and provide a pipe coupling for use with pipe undergoing protective treatment by being helically advanced through a treating zone, said pipe couplings being adapted to rotate and pull succeeding lengths of pipe and to rotate and push preceding sections of pipe and permit ready separation of the preceding sections of pipe from the driven sections of pipe.

Another object is to disclose and provide an internally expanding pipe coupling.

A still further object is to disclose and provide an internally expanding pipe coupling which may be readily inserted into and fastened in position.

A still further object is to disclose and provide a pipe joint including couplings which distribute and balance forces exerted on such coupling and joint.

Other objects, uses and advantages of this invention will become apparent to those skilled in the art from the following detailed description of the invention. In describing the invention, reference will be had to the appended drawing, in which:

Fig. 1 is a diagrammatical illustration of three longitudinally aligned sections of pipe being helically advanced through a pipe treating zone.

Fig. 2 is a longitudinal section of a preferred form of pipe coupling.

Fig. 3 is an end elevation of the coupling shown in Fig. 2.

Fig. 4 is a longitudinal section of a modified form of coupling.

Figs. 5 and 6 and 7 are longitudinally sections of still further modifications that the coupling of this invention may assume.

As has been stated heretofore, the couplings of this invention will be particularly described as applied to adjacent longitudinally aligned sections of pipe being passed through a treating zone in which the exterior surfaces of the pipe are coated, painted, cleaned, wrapped or otherwise treated.

The coupling of this invention are of an internal expanding type adapted to be inserted into the end of a section of pipe and locked in position therein by engagement with the interior surfaces of the pipe. Every coupling portion is perfectly identical in construction to every other coupling portion so that the coupling elements are interchangeable with each other. The joint formed between coupling portions is in general similar to a bayonet joint.

As shown in Fig. 1, the pipe 1 provided with a coupling portion 2 at one end and a coupling portion 3 at the other end is helically advanced in any suitable manner, by means of a device acting upon the pipe 1 at say the point A. Means for helically advancing the pipe are well known in the art and such means are not shown as they do not form a part of the present invention. Means such as are shown in a copending application Serial No. 420,807, filed by Roger H. Boughton, may be employed, however. Another form of pipe advancing means is shown in patent to Mohn No. 1,335,616.

The pipe 1 is helically advanced in the direction of the arrow. For purposes of illustration, a strip of wrapping material 4 is being applied to the pipe 1. The coupling 2 carried by the rear end of the pipe 1 is in engagement with a coupling 5 carried by the forward end of a pipe 6. As shown in the drawing, the couplings 2 and 5 are in interengagement with each other so that the helical advance imparted to the pipe 1 is transmitted to the pipe 6 by the couplings 2 and 5. The pipe 1 is therefore pulling and rotating the pipe 6. The preceding section of pipe in advance of the driving zone A, namely, the pipe section 7, had similarly been connected to the pipe 1 through the couplings 8 and 3.

After the joint formed by the coupling portions 8 and 3 has passed through the driving zone A, then the mass of the pipe section 7 permits the coupling 3 to be partially rotated with respect to the coupling portion 8, the coupling portion 3 being the driving coupling whereas the coupling portion 8 was the driven coupling. As a result, the pipe section 1 became partially disengaged with the pipe section 7 as the coupling portions 3 and 8 partially rotated relatively to each other and released their interlocking engagement. Rotation, however, is still being imparted to the pipe section 7 by the pipe section 1 and the pipe section 7 is still being longitudinally advanced by the pipe 1 but the pipe section 7 may be completely and rapidly disengaged from the section 1 by merely pulling the pipe 7 longitudinally away from the section 1 as indicated by the arrow above the pipe 7.

The pipe 7 may therefore be removed from the section 1 merely by exerting a longitudinal pull but the pipe 6 cannot be removed from the section 1 by merely exerting a longitudinal pull in a direction opposed to the direction in which the pipe 1 is being helically advanced.

The coupling portions described in use hereinabove may assume a variety of forms. A preferred form is shown in Figs. 2 and 3. The coupling may consist of a substantially cylindrical body portion provided with longitudinally extending members or projections provided with shoulders near their outer ends, said shoulders being adapted to come into engagement with similar shoulders on another coupling.

As shown in Fig. 2, the coupling may comprise a cylindrical body member 10 provided with a central aperture 11. The coupling may also include a centrally ported rear member 12, a bolt 13 extending through the central aperture in the member 12 and the port 11 of the member 10. The threaded end of the bolt 13 preferably extends through the port 11 and is provided with a nut 14 exteriorly of the member 10. Between the members 10 and 12 may be a cylindrical elastic member 15 preferably made of rubber or other elastic composition, adapted to increase in outside diameter upon the application of longitudinal pressure. Such longitudinal pressure may be exerted on the elastic member 15 by tightening the nut 14 on the bolt 13, thus causing the members 10 and 12 to advance toward each other. In order to prevent rotation of the bolt 13, a longitudinal keyway 16 may be formed therein, a suitable key being carried by the member 10 and extending into the keyway 16. As shown, such suitable key comprises a dog-ended set screw 17 threadedly mounted in an internally threaded radial bore in the body portion 10.

The body portion of the coupling may be provided with one or more longitudinally extending projections. As shown in Figs. 2 and 3, the body portion 10 is provided with two spaced and substantially opposed projections 18, said projections 18 being in the form of segments of a hollow cylinder extending from the periphery of the body portion 10. Each of said longitudinally extending projections 18 is provided with a transversely extending shoulder 19 at its outer end so as to form a lip or abutment 20.

As shown in Fig. 2, the face of the abutment 20 is slightly undercut although this angular position of the face 20 is not essential and instead the face 20 may be transverse to the longitudinal axis of the coupling. The opposite side 21 of the longitudinal projection 18 is preferably plane, without projections or shoulders and preferably lying in a plane passing through the longitudinal axis of the coupling.

The major width of each longitudinal projection 18 at the point where the shoulder 19 is located, is preferably less than one-fourth of the circumference of each coupling. This is true when two of said projections 18 are used. When only one of said projections is used per coupling, then the major width is preferably less than one-half of the circumference of each coupling. When more than two projections 18 are employed, the major width of each projection is correspondingly reduced. As shown in Fig. 3, the longitudinally extending projections 18 and 18' are circumferentially spaced from each other so as to be on opposite sides of the body portion 10.

On one or more of the longitudinal projections 18 a lug 22 may be formed, said lug 22 extending transversely beyond the outer circumference of the coupling. Preferably the lugs 22 are positioned slightly beyond midway along the length of the projection 18 so as to permit the abutting surface 20 provided by the shoulder 19 to substantially bisect the lug 22.

In operation, couplings of the character described hereinabove are inserted into the ends of pipe sections which it is desired to join, such, for example, as the pipe section 9. The lugs 22 act as stops engaging with the end of the pipe 9 and thus prevent the coupling from being inserted to a greater depth into the pipe. After being inserted, the body portion of the coupling is expanded so as to engage with the inner surfaces of the pipe 9. Such expansion or locking may be accomplished by rotating the nut 14 so as to compress the resilient and elastic body 15, thus causing it to increase its diameter and grip the inner surfaces of the pipe. The coupling is thus firmly held in position within the pipe, the longitudinal member 18 partially extending beyond the end of the pipe. A similar coupling is placed in the end of another pipe which it is desired to removably connect with the pipe 9 and the pipe sections are then brought together so that the projections 18 of one coupling slide between the projections 18 of the other coupling. Partial rotation of the couplings and pipes in which they are mounted relatively to each other, will cause the shoulders 19 and particularly the abutting faces 20 to interengage, thus forming a locked joint such as is formed by the couplings 2 and 5 in Fig. 1. A partial rotation in the opposite direction will cause the shoulders 19 to disengage one another, the longitudinal projections 18 then contacting with their plane faces 21, thus permitting the pipe sections to be separated by a relative or longitudinal movement. The couplings 3 and 8 of Fig. 1 are shown in such disengaged position.

The forward edge of one coupling can, however, transmit a tractive force as well as a rotative force to another coupling as the forward ends of the projections carried by one coupling are in contact with the body portions, such as the members 10, of another coupling, whereas the plane sides 21 of each projection carried by each coupling is in contact with the plane sides 21 of the projection of a complementary coupling when the shoulders 19 are disengaged from each other.

A modified form of coupling is shown in Fig. 4. As shown therein, the coupling may consist of a body portion 30 of substantially cylindrical form, said body portion 30 being provided with a central longitudinally extending cavity 31. Rearwardly the tapering slots 32 are provided in the body portion 30, thus furnishing inclined faces 33. Sliding wedges with serrated surfaces such as the wedges 34, are placed on the inclines 33 formed in the slots 32 and if desired, suitably keyed to the inclined faces 33 by means of dovetailed keys extending from said inclined faces 33 into undercut grooves indicated at 35 and formed in the sliding wedges 34. The body portion 30 may be provided with a back plate 36 securely fastened to the body portion 30 as by means of pins or screws 37. The end plate 36 may be provided with a central port through which a bolt 38 extends. Threadedly mounted on the bolt may be a pusher plate 39 adapted to come in contact with the ends of the wedges 34.

The ends of the wedges 34 may be maintained in contact with the pusher plate 39 by means of a compression spring 40 positioned within the central port 31. Partial rotation of the head 41 of the bolt 38 will thus cause the pusher plate 39 to advance, pushing the wedges 34 up the inclined surfaces 33 so as to cause the outer serrated surfaces of the wedges to come into locking engagement with the interior surfaces of the pipe. The body portion 30 is, of course, preferably provided with one or more longitudinal projections 18 provided with transversely extending shoulders 19, such as have been described hereinbefore.

As shown in Fig. 5, a simple form of the coupling may comprise a body portion 10 provided with longitudinally extending projections 18 and a rear portion 42 provided with a central port through which the bolt 13 may extend. Connecting the body portion 10 and the rear plate 42 are a plurality of spring members 43, said spring members 43 being preferably peripherally spaced and connected to both the body portion 10 and the rear plate 42. Pivotally connected to the end of bolt 13 may be a cam-shaped member 70 provided with a lug 71. By partially rotating the cam 70, the rear plate 42 may be caused to approach or recede from the front portion 10, thus causing the springs 43 to either expand outwardly and thus contact with the inner surfaces of the pipe or collapse and recede therefrom. The cam means of locking the couplings may obviously be of various forms, and may be applied on coupling members of any desired construction.

The device shown in Fig. 6 comprises a body portion 45 bearing a central longitudinal port through which a bolt 46 extends. The bolt 46 carries on its rear threaded portion a conical member 47 provided with an internally threaded bore in threaded engagement with the bolt 46. The conical portion 47 may also carry a pin 48 adapted to slidably enter a bore 49 in the body portion 45. By rotation of the bolt head 50 of the bolt 46, the conical member 47 may be caused to move longitudinally upon the bolt 46, the conical member 47 being prevented from rotation by engagement with the pin 48 with the bore 49. Surrounding the cone 47 may be a plurality of wedges 51 provided with inner inclined faces 52 adapted to slidingly engage with the outer conical surface 47. The wedge members 51 may be kept in sliding engagement with the cone 47 by means of a contracting ring or rings 53. In this manner, the wedges 51 may be moved outwardly to contact with and engage the inner surfaces of the pipe.

The device shown in Fig. 7 comprises a body portion 54 provided with a central bore through which the bolt 55 may extend and an enlarged bore portion indicated at 56. The body portion 54 may also be provided with radial slots, such as the slot 57, in which dogs 58 are pivoted on pins 59, each of the dogs 58 being provided with a serrated outer surface and an inner cam shaped surface indicated at 60.

The body portion 54 may be provided with an end plate 61 attached thereto as by means of screws 62 and a central bore through which the bolt 55 extends. The threaded portion of the bolt within the enlarged bore 56 may have mounted thereon an internally threaded spherical or other suitably curved cam 63. The end of the bolt 55 exteriorly of the body portion 54 may be provided with a nut 64 locked thereon by means of a set screw 65. The rotation of the nut 64 will cause the bolt 55 to rotate, thus imparting longitudinal motion to the cam 63, said longitudinal motion being translated into outward or pivoted motion of the dogs 58 on their pivot pins 59. In this manner, the coupling may be locked within the pipe or released.

It will thus be seen that a very simple and effective internally acting pipe coupling has been provided, said coupling performing all of the functions required in a ready and economical manner. Although some of the characteristics of couplings made in accordance with my invention have been described in detail, those skilled in the art will readily discern other important characteristics. Furthermore, although a number of forms that the invention may take have been disclosed, other modifications will become obvious to those skilled in the art. The invention is not limited to any specific form of construction nor to the employment of any particular number of longitudinally projecting members 18.

Although it has been stated that the body portion of the couplings, such as the portions 10, 30, 45 and 54, are preferably of circular cross section, it is to be understood that other shapes may be employed.

All such changes and modifications as come within the scope of the appended claims are therefore embraced thereby.

I claim:

1. A coupling for metallic pipe comprising a body portion and a back plate, elastic deformable means held between said body portion and back plate, means connecting said body portion, back plate and elastic means and for deforming said elastic means to contact with the interior surfaces of a pipe to anchor the coupling therein, and longitudinally extending members carried by said body portion, each of said members being provided with a transversely extending shoulder near its outer end, said shoulders extending from said members in the same circumferential direction.

2. A coupling for metallic pipe comprising a body portion, a back plate, elastic deformable means held between said body portion and back plate, means connecting said body portion, back plate and elastic means and for deforming said elastic means to contact with the interior surfaces of a pipe to anchor the coupling therein, and longitudinally extending members carried by said body portion, each of said members being provided along one longitudinal edge with a transversely extending shoulder near its outer end, opposite longitudinal sides of each of said members lying substantially in a plane passing through a longitudinal axis of the coupling, said shoulders extending from said members in the same circumferential direction, said members being peripherally spaced from each other not less than the major width of said members.

3. A coupling for metallic pipe comprising a body portion, a back plate, elastic deformable means held between said body portion and back plate, means connecting said body portion, back plate and elastic means and for deforming said elastic means to contact with the interior surfaces of the pipe to anchor the coupling therein, longitudinally extending members carried by said body portion, each of said members being provided along one longitudinal edge with a transversely extending shoulder near its outer end to form an abutment facing said body portion and extending in a plane substantially perpendicular to the longitudinal axis of the coupling, opposite longitudinal sides of each of said members lying substantially in a plane passing through the longitudinal axis of the coupling, said shoulders extending from said members in the same circumferential direction, and radially extending lugs carried by said coupling substantially in the plane of said abutments to position the coupling within a pipe.

4. A coupling for metallic pipe comprising a body portion, a back plate, elastic deformable means held between said body portion and back plate, means connecting said body portion, back plate and elastic means and for deforming said elastic means to contact with the interior surfaces of a pipe to anchor the coupling therein, and longitudinally extending members carried by said body portion, each of said members being provided along one longitudinal edge with a transversely extending shoulder near its outer end to form an abutment facing said body portion and extending in a plane substantially perpendicular to the longitudinal axis of the coupling, opposite longitudinal sides of each of said members lying substantially in a plane passing through the longitudinal axis of the coupling, said shoulders being less than one-half the length of said members, said members being peripherally spaced from each other not less than the major width of said members.

5. A coupling for metallic pipe comprising a body portion, a back plate, elastic deformable means held between said body portion and back plate, a bolt connecting said body portion and back plate and extending through said elastic means, means for imparting longitudinal motion to said bolt to deform said elastic means to contact with the interior surfaces of a pipe to anchor the coupling therein, and longitudinally extending members carried by said body portion, each of said members being provided with a transversely extending shoulder near its outer end, said shoulders extending from said members in the same circumferential direction.

6. A coupling for metallic pipe comprising a body portion, a back plate, elastic deformable means held between said body portion and back plate, a bolt connecting said body portion and back plate and extending through said elastic means, means for imparting longitudinal motion to said bolt to deform said elastic means to contact with the interior surfaces of a pipe to anchor the coupling therein, and longitudinally extending members carried by said body portion, each of said members being provided with a transversely extending shoulder near its outer end, said shoulders extending from said members in the same circumferential direction, said members being peripherally spaced from each other not less than the major width of said members.

7. A coupling for metallic pipe comprising a body portion, a back plate, elastic deformable means held between said body portion and back plate, a bolt connecting said body portion and back plate and extending through said elastic means, means for preventing rotation of said bolt while permitting longitudinal motion thereof, means for imparting longitudinal motion to said bolt to deform said elastic means to contact with the interior surfaces of a pipe to anchor the coupling therein, and longitudinally extending members carried by said body portion, each of said members being provided with a transversely extending shoulder near its outer end, said shoulders extending from said members in the same circumferential direction.

8. A coupling for metallic pipe comprising a body portion, a back plate, elastic deformable means held between said body portion and back plate, a bolt connecting said body portion and back plate and extending through said elastic means, means for preventing rotation of said bolt while permitting longitudinal motion thereof, means for imparting longitudinal motion to said bolt to deform said elastic means to contact with the interior surfaces of a pipe to anchor the coupling therein, and longitudinally extending members carried by said body portion, each of said members being provided with a transversely extending shoulder near its outer end, said shoulders extending from said members in the same circumferential direction, said members being peripherally spaced from each other not less than the major width of said members.

9. A coupling for metallic pipe comprising a body portion, a back plate, elastic deformable means held between said body portion and back plate, a bolt connecting said body portion and back plate and extending through said elastic means, means for preventing rotation of said bolt while permitting longitudinal motion thereof, means for imparting longitudinal motion to said bolt to deform said elastic means to contact with the interior surfaces of a pipe to anchor the coupling therein, and longitudinally extending members carried by said body portion, each of said members being provided along one longitudinal edge with a transversely extending shoulder near its outer end, opposite longitudinal sides of each of said members lying substantially in a plane passing through the longitudinal axis of the coupling, said shoulders extending from said members in the same circumferential direction, said members being peripherally spaced from each other not less than the major width of said members.

10. A coupling for metallic pipe, comprising a body portion provided with elastic deformable means and means for deforming said elastic means to contact with the interior surfaces of a pipe to anchor the coupling therein, and longitudinally extending members carried by said body portion, each of said members being provided with a transversely extending shoulder near its outer end, said shoulders extending from said members in the same circumferential direction.

11. A coupling for metallic pipe, comprising a body portion adapted to be inserted into a pipe, said body portion being provided with an elastic deformable means and means for deforming said elastic means to contact with the interior surfaces of the pipe to anchor the coupling therein, and longitudinally extending members carried by said body portion, each of said members being provided along one longitudinal edge with a transversely extending shoulder near its outer end, said shoulders extending from said members in the same circumferential direction, said members being circumferentially spaced from each other not less than the major width of said members.

CARLL W. HUNT.